United States Patent
Lee et al.

(10) Patent No.: US 6,356,566 B1
(45) Date of Patent: Mar. 12, 2002

(54) CLOCK SIGNAL GENERATING APPARATUS FOR DATA COMMUNICATION CHANNEL

(75) Inventors: Tae Hee Lee, Seoul; Jong Ho Kim, Daejeon; Jeong Hoon Ko, Daejeon; Yoo Kyoung Lee, Daejeon, all of (KR)

(73) Assignees: Electronics and Telecommunications Research Institute, Daejeon (KR); Korea Telecom, Seoul (KR)

( * ) Notice: Subject to any disclaimer, the term of this patent is extended or adjusted under 35 U.S.C. 154(b) by 0 days.

(21) Appl. No.: 09/111,235

(22) Filed: Jul. 7, 1998

(30) Foreign Application Priority Data

Nov. 28, 1997 (KR) .............................................. 97-64105

(51) Int. Cl.[7] .................................................. H04J 3/06
(52) U.S. Cl. ........................................ 370/509; 713/400
(58) Field of Search .................................. 370/503, 509, 370/512, 532, 536; 713/400

(56) References Cited

U.S. PATENT DOCUMENTS

| | | | |
|---|---|---|---|
| 5,020,057 A | * 5/1991 | Tanigushi et al. | ............ 370/506 |
| 5,140,618 A | * 8/1992 | Kinoshita et al. | ............ 375/368 |
| 5,282,206 A | * 1/1994 | Ishihara et al. | ............. 370/509 |
| 5,917,818 A | * 6/1999 | Ko et al. | |
| 5,930,273 A | * 7/1999 | Mukojima | .................. 714/776 |

\* cited by examiner

Primary Examiner—Hassan Kizou
Assistant Examiner—Ahmed Elallam
(74) Attorney, Agent, or Firm—Cohen, Pontani, Lieberman & Pavane

(57) ABSTRACT

A clock signal generating apparatus for a data communication channel is disclosed which includes a first clock signal generating unit for receiving an external input clock signal and a frame position informing signal and outputting a predetermined cycle first clock signal and a first timing signal, a second clock signal generating unit for receiving the first clock signal and the first timing signal and externally outputting a first offset signal, a second timing signal, and a predetermined cycle second clock signal, respectively, and a third clock signal generating unit for receiving the first clock signal and the first timing signal and externally outputting a second offset signal, a third timing signal and a predetermined cycle third clock signal, respectively, for thereby implementing a reliable serial/parallel conversion, extraction and insertion of a data by generating a stable clock and timing signal using a simple circuit and supplying a stable clock signal for matching with an external apparatus for thereby achieving a reliable data communication for a system.

27 Claims, 10 Drawing Sheets

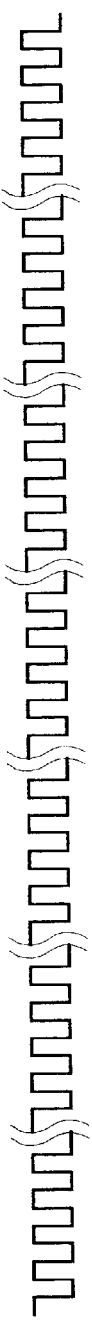
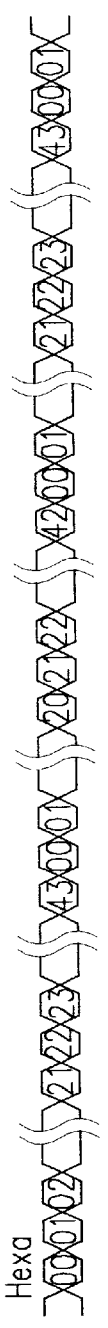
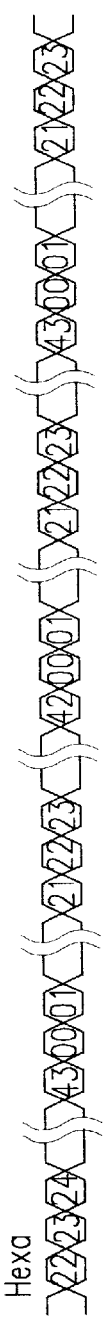
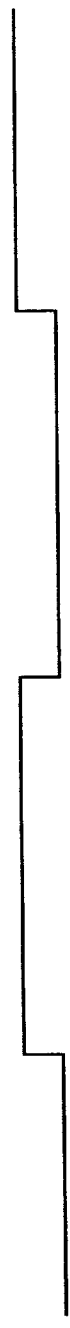
FIG.6A1 FIG.6B1 FIG.6C1 FIG.6D1 FIG.6E1 FIG.6F1 FIG.6G1 FIG.6H1

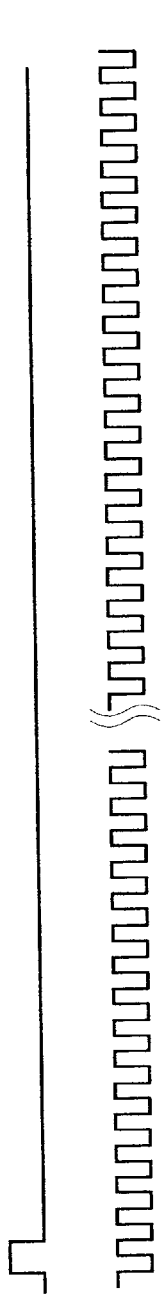
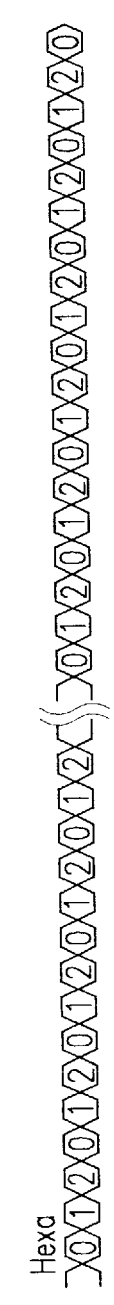
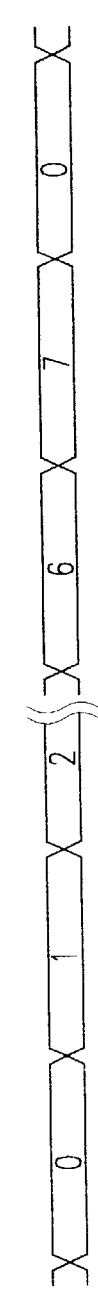
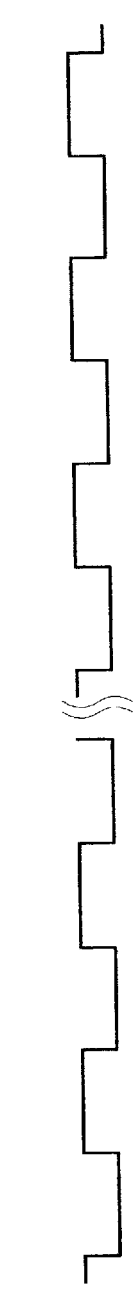
FIG.10A3
FIG.10B3
FIG.10C3
FIG.10D3
FIG.10E3
FIG.10F3
FIG.10G3

CLOCK SIGNAL GENERATING APPARATUS FOR DATA COMMUNICATION CHANNEL

BACKGROUND OF THE INVENTION

1. Field of the Invention

The present invention relates to a clock signal generating apparatus for a data communication channel which generates a clock signal used for a regenerator section data communication channel and a multiplex section data communication channel for a STM(Synchrnous Transfer Mode)-N system, and in particular, to an improved clock signal generating apparatus for a data communication channel which is capable of generating clock and timing signals used for extracting and inserting an overhead used for a regenerator section data communication channel and a multiplex section data communication channel in a section overhead formed in a STM-N frame structure for a STM-N system for thereby matching the thusly extracted and inserted overhead with an external apparatus.

2. Description of the Conventional Art

In the conventional clock signal generating apparatus for a data communication channel, clock and timing signals used for a data communication channel are generated using 51.8 MHz clock signal. Namely, 51.8 MHz clock signal is divided based on 90- and 180-divides for thereby generating 576 KHz clock signal. In addition, the 51.8 MHz clock signal is divided based on 270- and 540-divides for thereby generating 192 KHz clock signal and its timing signal. In order to generate clock and timing signals, a complicated circuit and a predetermined number of counters which operate at 51.84 MHz are used. Therefore, much electric power is required. In addition, there is a problem in that a timing delay signal generated when processing a high speed 51.8 M-class signal between devices should be accurately compensated.

Furthermore, In case of using 77.76 MHz clock signal in forming a STM-N frame structure for a STM-N system, there are big problems for generating the above-described signals since the timing signals used for a serial/parallel conversion, extraction and insertion of a data for a data communication channel are not integer-time of 77.76 MHz.

SUMMARY OF THE INVENTION

Accordingly, it is an object of the present invention to provide a clock signal generating apparatus based on 77.76 MHz clock signal for a data communication channel which overcomes the aforementioned problems encountered in the conventional art.

It is another object of the present invention to provide a clock signal generating apparatus based on 77.76 MHz clock signal for a data communication channel which is capable of implementing a reliable serial/parallel conversion, extraction and insertion of a data by generating a stable clock and timing signal using a simple circuit and supplying a stable clock signal for matching with an external apparatus for thereby achieving a reliable data communication for a system.

It is still another object of the present invention to provide a clock signal generating apparatus based on 77.76 MHz clock signal for a data communication channel which is directed to generating clock and timing signals used for extracting and inserting an overhead used for a regenerator section data communication channel and a multiplex section data communication channel in a section overhead formed in a STM-N frame structure for a STM-N system for thereby matching the thusly extracted and inserted overhead with an external apparatus.

In order to achieve the above objects, there is provided a clock signal generating apparatus based on 77.76 MHz clock signal for a data communication channel which includes a first clock signal generating unit for receiving an external input clock signal and a frame position informing signal and outputting first clock signal having a predetermined cycle and a first timing signal, a second clock signal generating unit for receiving the first clock signal and the first timing signal and externally outputting a first offset signal, a second timing signal, and second clock signal having a predetermined cycle, respectively, and a third clock signal generating unit for receiving the first clock signal and the first timing signal and externally outputting a second offset signal, a third timing signal and cycle third clock signal having a predetermined cycle, respectively.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A1 through 6H1 are wave form diagrams illustrating timing of signals outputted from a first clock signal generating unit according to the present invention;

FIGS. 8A2 through 8F2 are wave form diagrams illustrating timing of signals outputted from a second clock signal generating unit of FIG. 7 according to the present invention;

FIGS. 10A3 through 10G3 are wave form diagrams illustrating timing of signals outputted from a third clock signal generating unit of FIG. 9 according to the present invention.

DETAILED DESCRIPTION OF THE INVENTION

The clock signal generating apparatus for a data communication channel according to the present invention will be explained with reference to the accompanying drawings.

Figure 1:
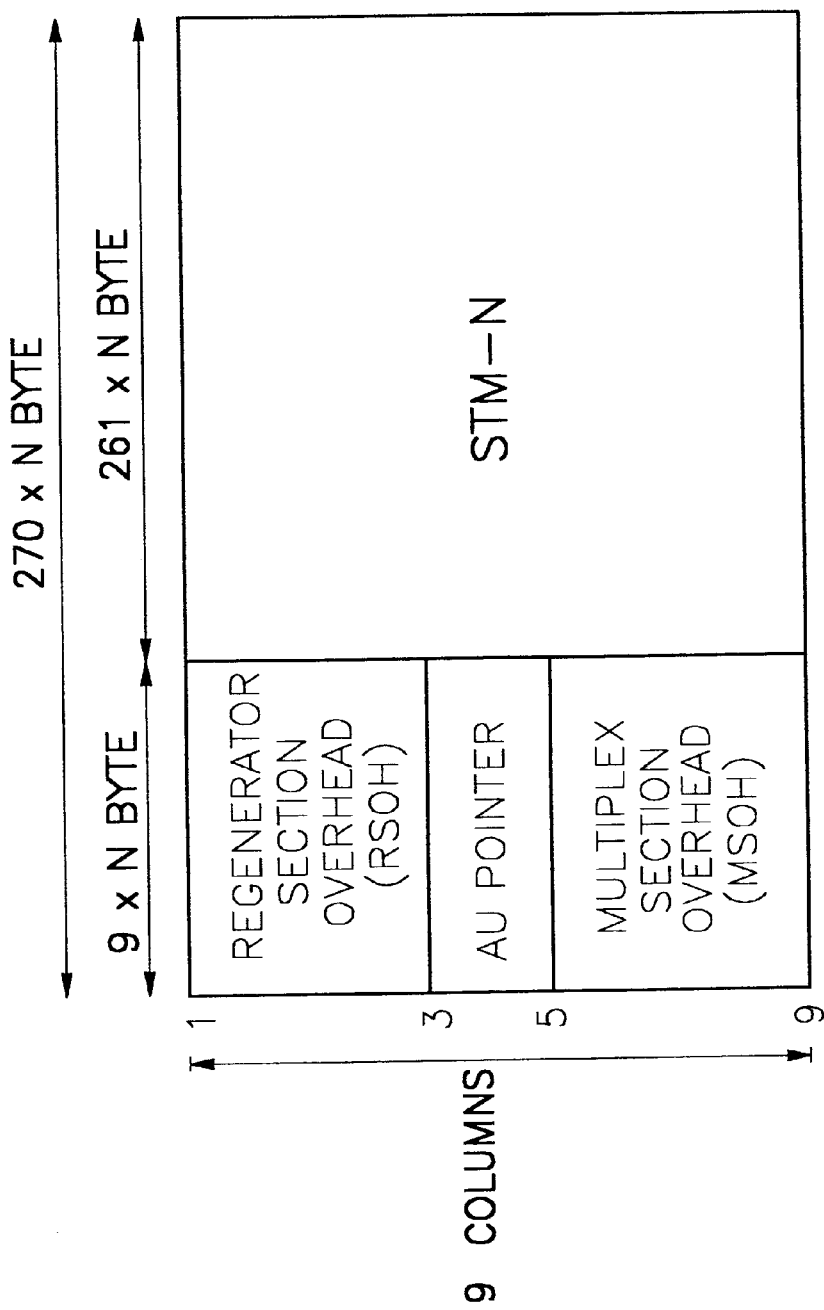
FIG. 1 is a view illustrating the construction of a STM-N signal frame according to the present invention.

FIG. 1 illustrates the construction of a STM-N signal frame according to the present invention. As shown therein, in the frame of a STM-N signal frame, (270×N) bytes are formed in a horizontal direction, and 9 columns are formed in a vertical direction. The length of one frame is 125 MS (Micro second). In the frame structure of a STM-N signal, the (9×N) columns consist of section overheads which are divided into a regenerator section overhead and a multiplex section overhead.

Figure 2:
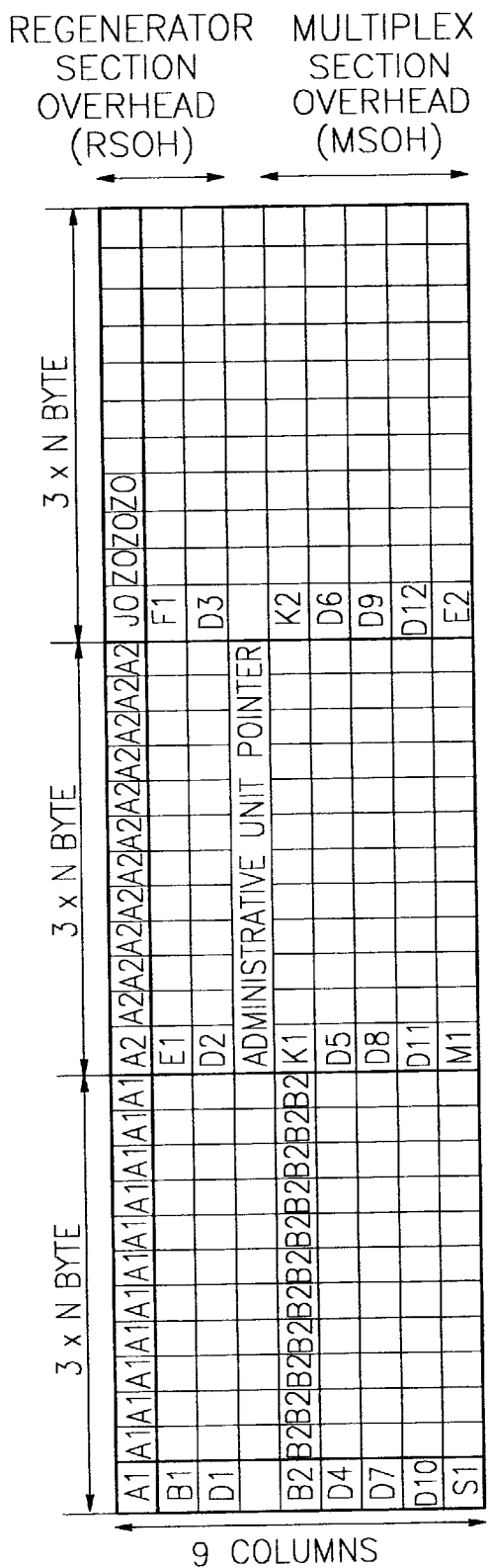
FIG. 2 is a view illustrating the construction of an section overhead of FIG. 1 according to the present invention.

FIG. 2 illustrates the construction of an section overhead of FIG. 1 according to the present invention. As shown therein, D1, D2 and D3 bytes which are a regenerator section data communication channel DCCR are positioned in a regenerator section overhead and are recognized as one serial 192 kbit/s channel, and D4, D5, D6, D7, D8, D9, D10, d11 and D12 bytes of a multiplex section data communication channel (DCCM) are positioned in a multiplex section overhead and are recognized as one 576 kbit/s channel.

Figure 3A:
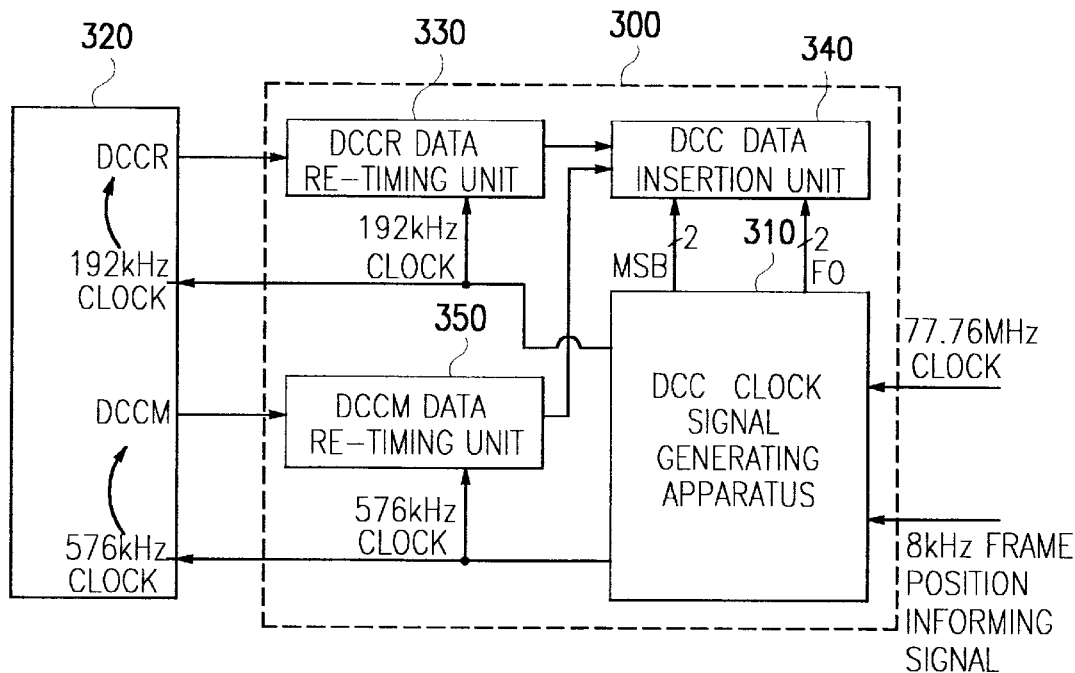
FIGS. 3A and 3B are views illustrating a signal flow between a STM(Synchrnous Transfer Mode)-N system and an external apparatus according to the present invention.
Figure 3B:
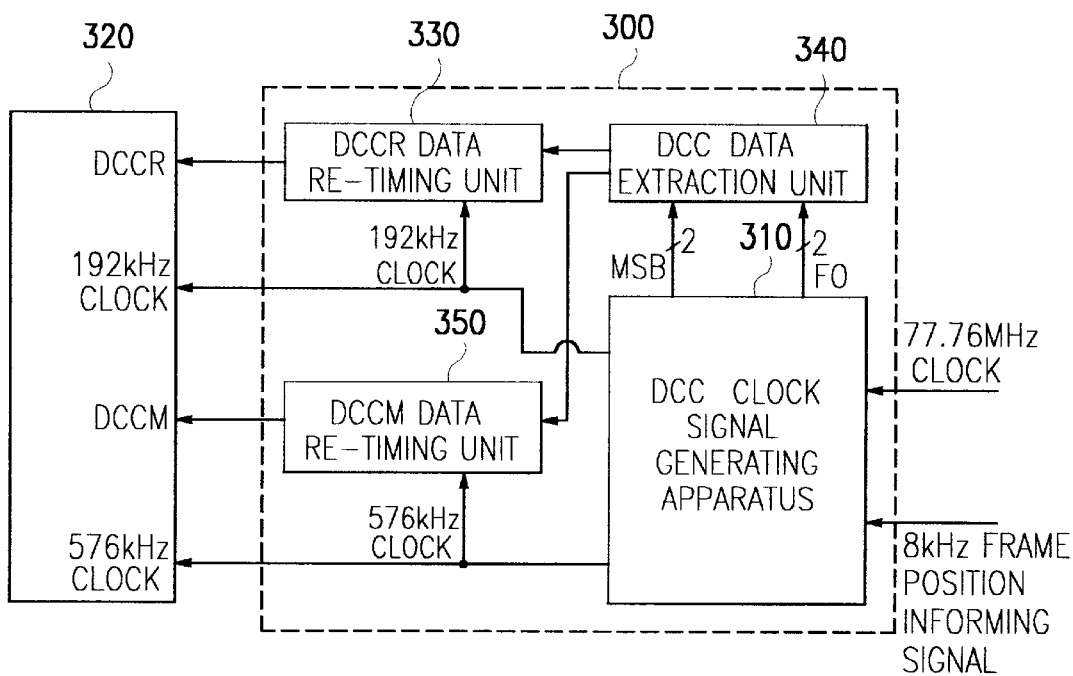

FIGS. 3A and 3B are views illustrating a signal flow between a STM(Synchrnous Transfer Mode)-N system and an external apparatus according to the present invention.

As shown in FIG. 3A, in the transfer mode for a STM-N system, the DCC clock signal generating apparatus 310 of a data communication channel processing unit 300 according to the present invention receives a 77.76 MHz clock signal and an 8 KHz frame position informing signal, generates 192 KHz clock signal and 576 KHz clock signal and transmits a DCC data to an external apparatus 320. The external apparatus 320 transmits a serial 192 Kbit/s DCCR data synchronized to a 192 KHz clock signal and a serial 576 Kbit/s DCCM data synchronized to a 576 KHz clock signal to a data communication channel processing unit 300, respectively. A DCCR data re-timing unit 330 of the data communication channel processing unit 300 performs a re-timing operation for a DCCR data at 192 KHz clock and transmits to a DCC data insertion unit 340. The DCCM data retiming unit 350 performs a re-timing operation for the DCCM data at 576 KHz clock and transmits to the DCC data insertion unit 340. Since the serial DCCR data consists of three bytes (totally 24 bits), the DCC clock signal generating apparatus 310 generates three timing signals over one frame, all of the signals become high level at a first bit of each byte, and generates one frame offset signal over one frame in which the first bit of the first byte among three bytes is a high level. The DCC data insertion unit 340 receives a serial DCCR timing signal and frame offset signal outputted from the DCC clock signal generating apparatus 310 and converts the thusly received signals into a parallel signal and inserts into each position of the STM-N frame. The insertion method of the DCCM data is the same as the DCCR data insertion method. Since the serial DCCM data consists of nine bytes (totally 72 bits) within one frame, the DCC clock generating apparatus 310 generates nine timing signals over one frame, which signals become high level at the first bit of each byte and generates one frame offset signal over one frame which becomes a high level at the first bit of the first byte among nine bytes.

As shown in FIG. 3B, when the STM-N system is in the receiving mode, the parallel DCCR data and the DCCM data extracted from the STM-N frame are converted into a serial 192 Kbit/s DCCR data and a serial 576 Kbit/s DCCM data, respectively, using a 192 KHz clock signal and 576 KHz clock signal and their timing signals outputted from the DCC clock signal generating apparatus 310 and outputs to the external apparatus 320 together with their corresponding clock signals.

The 192 KHz clock signal and 576 KHz clock signal outputted from the DCC clock signal generating apparatus 310 according to the present invention are used for an internal data re-timing and a data serial/parallel conversion and are connected with an external apparatus. Therefore, a stable frequency clock is required. In addition, the timing signal and frame offset signal generated by the DCC clock signal generating apparatus are timing signals which are used for a serial/parallel conversion and extraction and insertion of a DCCR and DCCM data and are generated based on a stable clock signal. The 77.76 MHz clock signal is the integer time of the 192 KHz clock signal and the 576 KHz clock signal, respectively, when the 77.76 MHz clock signal is divided by 405- and 135-divides, respectively, 192 KHz clock signal and 576 KHz clock signal are obtained.

However, Since the DCCR timing signal, the frame offset signal, the DCCM timing signal, and the frame offset signal are not integer time of the 77.76 MHz clock signal, the DCCR timing signal and the frame offset signal are obtained by dividing the 77.76 MHz clock signal by a 202.5-divide. In addition, the DCCM timing signal and the frame offset signal are obtained by dividing the 77.76 MHz clock signal by a 67.5-divide. Therefore, it is very difficult to obtain the above-described clock signals. Therefore, in the present invention, the 77.76 MHz clock signal is divided into two 576 KHz clock signals, and a stable 1152 KHz clock signal is generated using an exclusive OR-gate with respect to two 576 KHz clock signals and then 192 KHz clock signal and 576 KHz clock signals are generated based on a 6- and 2-divides. Therefore, it is possible to generate a timing signal and a frame offset signal, which are the signals used for a serial/parallel conversion and extraction and insertion of a data of each data communication channel using a more simple circuit.

Figure 4:
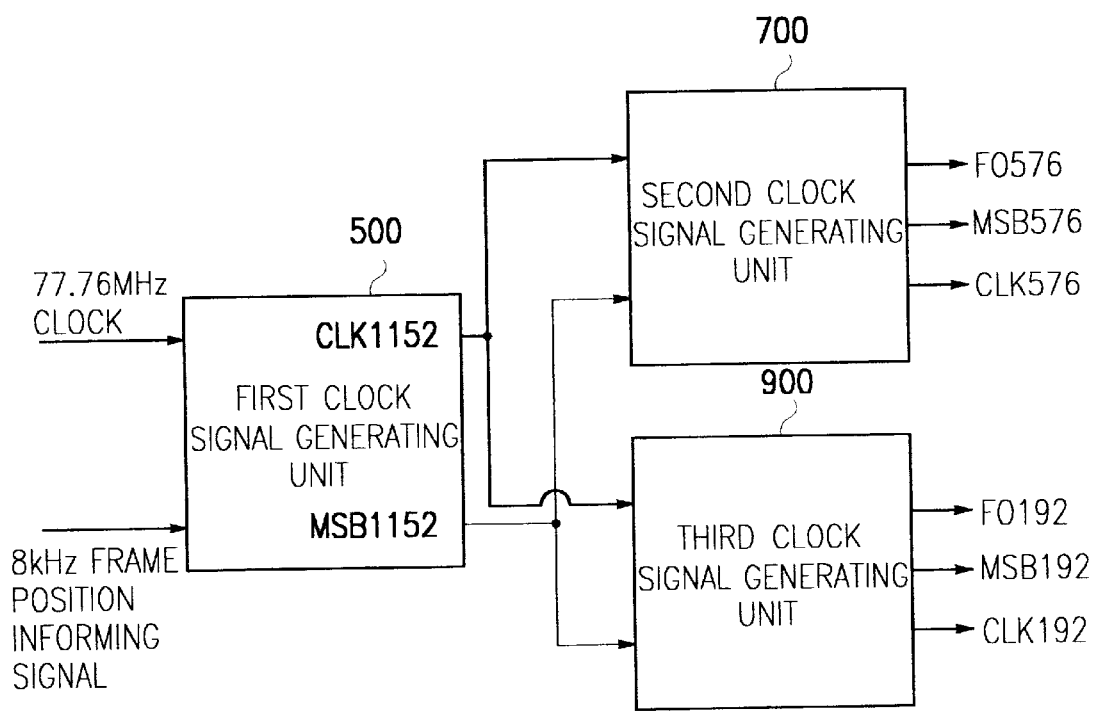
FIG. 4 is a block diagram illustrating a clock signal generating apparatus for a data communication channel according to the present invention.

FIG. 4 illustrates a clock diagram of a clock signal generating apparatus for a data communication channel according to the present invention.

As shown therein, the clock signal generating apparatus for a data communication channel according to the present invention includes a first clock signal generating unit 500 for externally receiving a 77.76 MHz clock signal and an 8 KHz frame position informing signal and outputting a 1152 KHz clock signal CLK1152 and a corresponding timing signal MSB1152, a second clock signal generating unit 700 for receiving a 1152 KHz clock signal CLK1152 and a timing signal MSB1152 outputted from the first clock signal generating unit 500 and outputting a frame offset signal FO576 and a timing signal MSB576, and a third clock signal generating unit 900 for receiving a 1152 KHz clock signal CLK1152 and a timing signal MSB1152 outputted from the first clock signal generating unit 500 and outputting a frame offset signal FO192 and a timing signal MSB192.

The operation of the clock signal generating apparatus for a data communication channel according to the present invention will now be explained with reference to the accompanying drawings.

Figure 5:
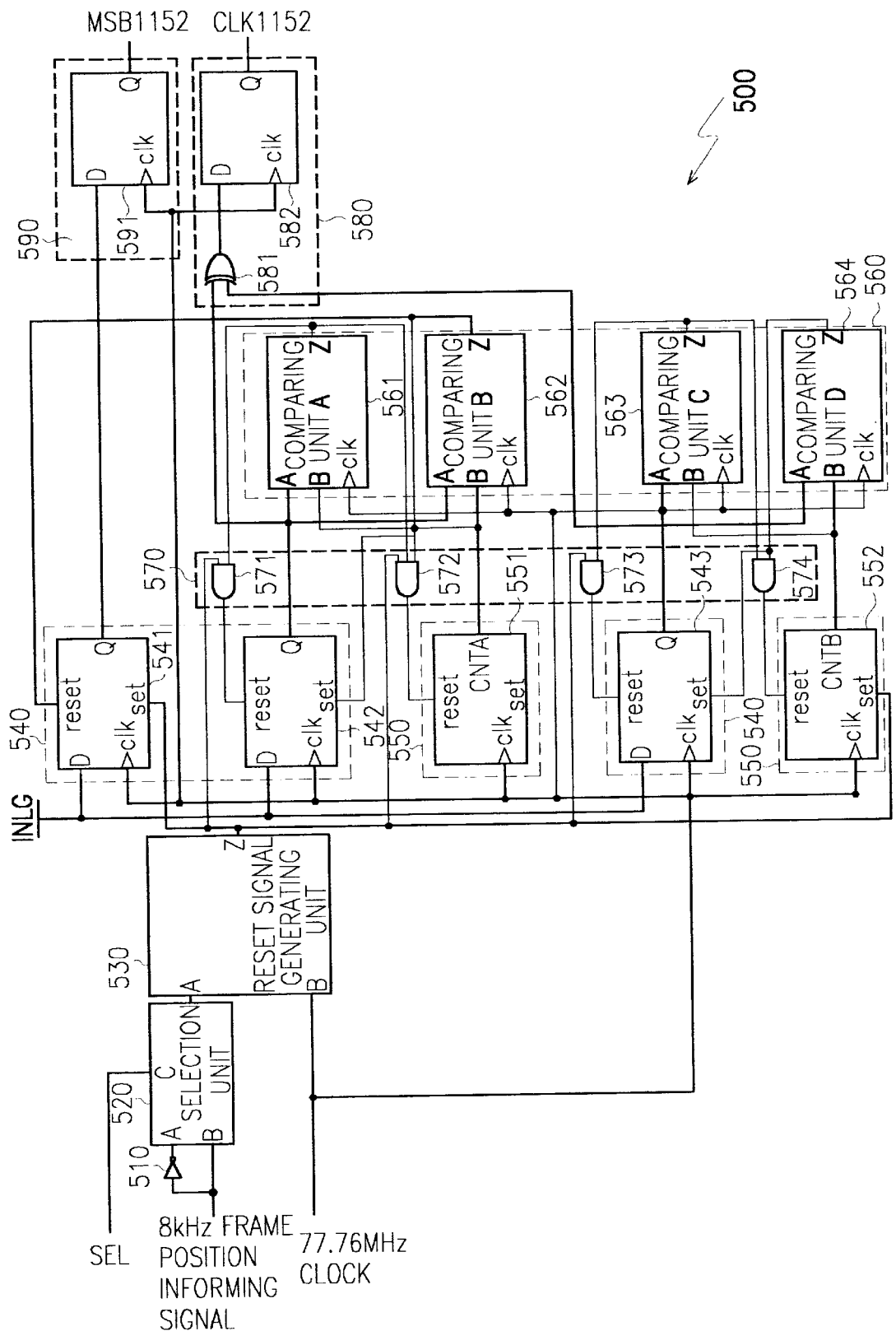
FIG. 5 is a block diagram illustrating a first clock signal generating unit of FIG. 4 according to the present invention.

FIG. 5 illustrates a block diagram of a first clock signal generating unit of FIG. 3 according to the present invention As shown therein, the first clock signal generating unit includes an inverter 510 for inverting an externally inputted 8 KHz frame position informing signal, a selection unit 520 for selectively outputting an output signal outputted from the inverter 510 and an externally inputted 8 KHz frame position informing signal in accordance with an externally inputted selection SEL, a reset signal generation unit 530 for receiving an external 77.76 MHz clock signal and an output signal outputted from the selection unit 520 and outputting a reset signal, a latching unit 540 for latching an externally inputted 77.76 MHz clock signal and an externally inputted input logic signal INLG in accordance with an output signal outputted from the reset signal generating unit 530, a counting unit 550 for counting an externally inputted 77.76 MHz clock signal and outputting a 7-bit data, a comparing unit 560 for comparing an output signal outputted from the latching unit 540 with an output signal outputted from the counting unit 550 in accordance with an externally inputted 77.76 MHz clock signal, a logic computation unit 570 for logically computing an output signal outputted from the comparing unit 560 and an output signal outputted from the reset signal generating unit 530 and outputting to the latching unit 540 and the counting unit 550, respectively, a clock signal outputting unit 580 for receiving an output signal outputted from the latching unit 540 and an output signal outputted from the counting unit 550 in accordance with an externally inputted 77.76 MHz clock signal and outputting a 1152 KHz clock signal CLK1152, and a timing signal generating unit 590 for receiving an output signal outputted from the latching unit 540 in accordance with an externally inputted 77.6 clock signal and outputting a timing signal MSB1152.

The latching unit 540 includes a first D flip-flop 541 which receives an input logic signal INLG through an input terminal D and a 77.76 MHz clock signal through a clock terminal "clk". In addition, in the first D flip-flop 541, a set signal is connected with an output terminal of the reset signal generating unit 530 and the reset terminal "reset" is connected with an output terminal of the comparing unit 560. There is further provided a second D flip-flop 542 which receives an input logic signal INLG through an input terminal D. In the second D flip-flop 542, an reset terminal "reset" is connected with an output terminal of the logic computation unit 570, and an output terminal Q is connected with the comparing unit 560 and an input terminal of the first clock signal output unit 580. There is further provided a third D flip-flop 543 which receives an input logic signal INLG through an input terminal D. In the third D flip-flop 543, a clock terminal "clk" receives a 77.76 MHz clock signal, and a set terminal "set" is connected with an output terminal of the comparing unit 560, and a reset terminal "reset" is connected with an output terminal of the logic computation unit 570, and an output terminal Q is connected with the comparing unit 560 and an input terminal of the clock signal output unit 580.

The counting unit 550 includes a first counting unit 551 receiving a 77.76 MHz clock signal through a clock signal terminal "clk" and having a reset terminal "reset" connected with an output terminal of the logic computation unit 570 and an output terminal CNTA connected with an input terminal of the comparing unit 560, and a second counting unit 552 receiving a 77.6 MHz clock signal through a clock terminal and having a set terminal "set" connected with an output terminal of the reset signal generating unit 530, a reset terminal "reset" connected with an output terminal of the logic computation unit 570 and an output terminal CNTB connected with an input terminal of the comparing unit 560.

The comparing unit 560 includes a first comparing unit 571 receiving a 77.76 MHz clock signal through a clock terminal "clk" and having an input terminal A connected with an output terminal of the second D flip-clop 542, an input terminal B connected with an output terminal of the first counting unit 551 and an output terminal Z connected with an input terminal of the logic computation unit 570, a second comparing unit 572 receiving a 77.76 MHz clock signal through a clock terminal "clk" and having an input terminal A connected with an output terminal of the second D flip-flop 542, an input terminal B connected with an output terminal of the first counting unit 551 and an output terminal Z connected with a reset terminal "reset" of the first D flip-flop 541 and an input terminal of the logic computation unit 570, respectively, and third and fourth comparing units 573 and 574 each receiving 77.76 MHz clock signal through clock terminals "clk" and each having an input terminal A connected with an output terminal of the third D flip-flop 543, an input terminal B connected with an output terminal of the second counting unit 552 and an output terminal Z connected with an input terminal of the logic computation unit 570, respectively.

The logic computation unit 570 includes a first AND-gate 571 for ANDing an output signal outputted from the reset signal generating unit 530 and output signal outputted from the first comparing unit 561 and outputting a resultant value to a reset terminal "reset" of the second D flip-flop 542, a second AND-gate 572 for ANDing an output signal outputted from the reset signal generating unit 530, an output signal outputted from the first comparing unit 561, and an output signal outputted from the second comparing unit 562 and outputting a resultant value to a reset terminal "reset" of the first counting unit 551, a third AND-gate 573 for ANDing an output signal outputted from the reset signal generating unit 530 and an output signal outputted from the third comparing unit 563 and outputting a resultant value to a reset terminal "reset" of the third D flip-flop 543, and a fourth AND-gate 574 for ANDing output signals outputted from the third and fourth comparing units 563 and 564 and each outputting a resultant value to a reset terminal "reset" of the second counting unit 552, respectively.

The first clock signal outputting unit 580 includes an exclusive OR-gate 581 for exclusively ORing output signals outputted from the second and third D flip-flops 542 and 543 and a fourth D flip-flop 582 receiving a 77.76 MHz clock signal through a clock terminal "clk" and outputting a clock signal CLK1152 through an output terminal Q wherein its input terminal D is connected with an output terminal of the exclusive OR-gate 581.

The timing signal generating unit includes a fifth D flip-flop 591 receiving a 77.76 MHz clock signal outputted from a clock terminal "clk" and having an input terminal D connected with an output terminal of the first D flip-flop 541 and outputting a timing signal MSB1152 through an output terminal D.

The first and second counting units 551 and 552 are 7digit counting units.

The operation of the first clock signal generating unit of FIG. 4 will be explained.

An externally inputted 8 KHz frame position informing signal is inverted by the inverter 510 and inputted into an input terminal A of the selection unit 520, and the 8 KHz frame position informing signal is directly inputted into an input terminal B of the selection unit 520. The selection unit 520 selects an 8 KHz frame position informing signal corresponded to be adapted to a system in accordance with an externally inputted selection signal SEL and outputs to the reset signal generating unit 530. The reset signal generating unit 530 receives an 8 KHz frame position informing signal outputted from the selection unit 520 through an input terminal A and receives an externally inputted 77.76 KHz input clock signal through an input terminal B. When a 77.76 MHz clock signal is transited from a low level to a high level, the 8 KHz frame position informing signal is judged to be a high level or a low level. As a result of the judgement, if the signal is a high level, a low level reset signal is outputted through the output terminal Z.

The first D flip-flop 541 outputs a high level signal through an output terminal Q in accordance with a low level reset signal outputted from the reset signal generating unit 530. The second D flip-flop 542 outputs a low level signal through an output terminal Q in accordance with a low level reset signal outputted from the reset signal generating unit 530.

The first counting unit 531 counts "0" of an externally inputted logic signal INLG in accordance with a low level rest signal outputted from the reset signal generating unit 530 and outputs an output signal value "00" through an output terminal CNTA. The second counting unit 552 counts "0" of an externally inputted input logic signal in accordance with a low level reset signal outputted from the reset signal generating unit 530 and outputs an output signal value "34" outputted from an output terminal CNTB. In addition, when an externally inputted 77.76 MHz clock signal is transited from a low level to a high level, the output signal values of the first and second counting units 551 and 552 are increased by 1, respectively.

The first comparing unit 561 compares an output signal outputted from the second D flip-flop 542 and an output signal outputted from the first counting unit 551 by receiving the signals through an input terminal A and another input terminal B, respectively. If an output signal outputted from the second D flip-flop 542 is a high level, and an output signal outputted from the first counting unit 551 is "43", the first comparing unit 561 outputs a low level signal through the output terminal Z. The first AND-gate 571 receives a low level signal outputted from the first comparing unit 561 and outputs a low level signal and resets an output signal outputted from the second D flip-flop 542 to a low level. In addition, the second AND-gate 572 receives a low level signal outputted from the first comparing unit 561 and resets an output signal outputted from the first counting unit 551 to a "00" state.

The second comparing unit 561 compares an output signal outputted from the second D flip-flop 542 and an output signal outputted from the first counting unit 551 by receiving the signals through an input terminal A and another input terminal B, respectively. If an output signal outputted from the first D flip-flop 542 is a low level, and an output signal outputted from the first counting unit 551 is a "44", the second comparing unit 561 outputs a low level output signal through an output terminal Z. Thereafter, the second D flip-flop 542 is set to a high level in accordance with a low level signal outputted from the second comparing unit 561. The first counting unit 551 outputs an output signal value "00" in accordance with a low level signal outputted from the second AND-gate 572. The first D flip-flop 541 outputs a low level output signal in accordance with a low level signal outputted from the second comparing unit 561.

The clock signal outputting unit 580 receives output signals outputted from the second and third D flip-flops 542 and 543 in accordance with an externally inputted 77.76 MHz input clock signal and outputs one 576 KHz clock signal CLK1152, and the timing signal generating unit 590 receives an output signal outputted from the first D flip-flop 541 in accordance with an externally inputted 77.76 MHz input clock signal and outputs a timing signal MSB1152 transited to a high level by one frame at one time.

The third comparing unit 563 compares an output signal outputted from the third D flip-flop 543 and an output signal outputted from the second counting unit 552 by receiving the signals trough an input terminal A and another input terminal B, respectively. If an output signal outputted from the third D flip-flop 543 is a high level, and an output signal outputted from the second counting unit 552 is "43", the third comparing unit 563 outputs a low level signal through an output terminal Z, and the third AND-gate 573 outputs a low level signal to the third D flip-flop 543 and the fourth AND-gate 574 outputs a low level signal to the second counting unit 552. The third D flip-flop 543 outputs a low level signal through an output terminal Q in accordance with a low level signal outputted from the third AND-gate 573, and the second counting unit 552 outputs an output signal value "00" through an output terminal CNTB.

The fourth comparing unit 564 compares an output signal outputted from the third D flip-flop 543 and an output signal outputted from the second counting unit 552 by receiving the signals through an input terminal A and another input terminal B, respectively. If an output signal outputted from the third D flip-flop 543 is a low level, and an output signal value of the second counting unit 552 is "44", the fourth comparing unit 564 outputs a low level signal through an output terminal Z. The third D flip-flop 543 outputs a high level signal through an output terminal Q in accordance with a low level signal outputted from the fourth comparing unit 564, and the fourth AND-gate 574 receives a low level signal outputted from the fourth comparing unit 564 and outputs a low level signal to the second counting unit 552. The second counting unit 552 outputs an output signal value "00" through an output terminal CNTB in accordance with a low level signal outputted from the fourth AND-gate 574.

An output signal outputted from the second D flip-flop 542 and an output signal outputted from the third D flip-flop 543 are 576 KHz clock signals and differ from each other in their phases. The exclusive OR-gate 581 exclusively ORs an output signal outputted from the second D flip-flop 542 and an output signal outputted from the third D flip-flop 543 and outputs a 1152 KHz clock signal. In addition, the fourth D flip-flop 582 performs a re-timing operation for an output signal outputted from the exclusive OR-gate 581 at 77.76 MHz and outputs a 1152 KHz clock signal CLK1152 to the second and third clock signal generating units 700 and 900, respectively. In addition, the fifth D flip-flop 591 of the timing signal generating unit 590 performs a re-timing operation for an output signal outputted from the first D flip-flop 541 at 77.76 MHz and outputs a timing signal MSB1152 which is transited to a high level by one frame at a time to the second and third clock generating units 700 and 900.

FIGS. 6A1 through 6H1 are wave form diagrams illustrating timing of signals outputted from the first clock signal generating unit of FIG. 5.

As shown therein, FIG. 6A1 illustrates a timing of an externally inputted 8 KHz frame position information signal, FIG. 6B1 illustrates a timing of an externally inputted 77.76 MHz clock signal, FIG. 6C1 illustrates an output timing of the first counting unit 551, FIG. 6D1 illustrates an output timing of the second counting unit 552, FIG. 6E1 illustrates an output timing of the second D flip-flop 542, FIG. 6F1 illustrates an output timing of the third D flip-flop 543, FIG. 6G1 illustrates an output timing of the fifth D flip-flop 591, and FIG. 6H1 illustrates an output timing of the fourth D flip-flop 582.

Figure 7:
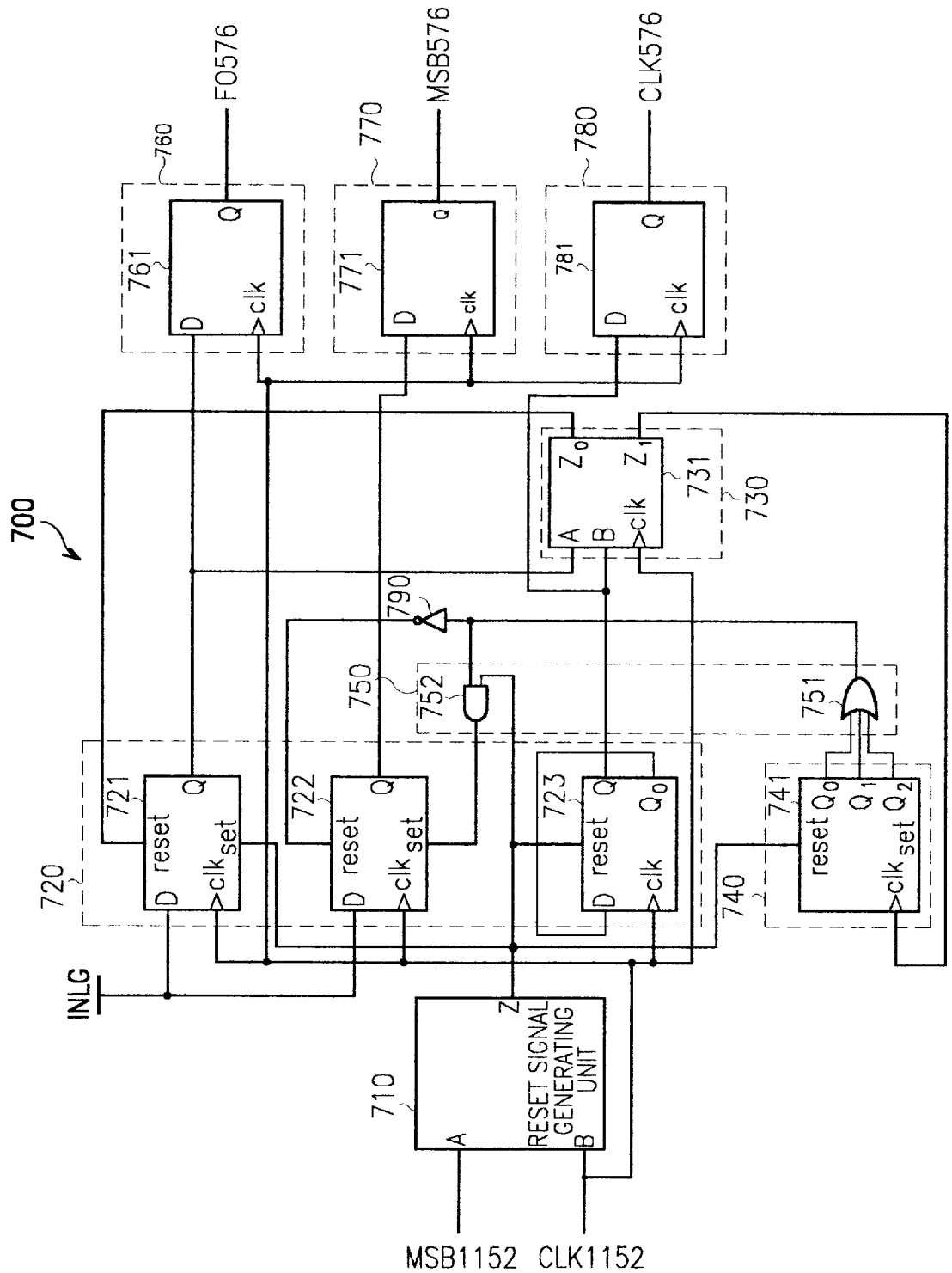
FIG. 7 is a block diagram illustrating a second clock signal generating unit of FIG. 4 according to the present invention.

FIG. 7 illustrates a second clock signal generating unit of FIG. 4 according to the present invention.

As shown therein, the second clock signal generating unit includes a reset signal generating unit 710 for receiving a timing signal MSB1152 from the first clock signal generating unit 500 and a 1152 KHz clock signal CLK1152 and outputting a reset signal, a latching unit 720 for latching an externally inputted input logic signal INLG in accordance with a 1152 KHz clock signal CLK1152 from the first clock signal generating unit 500, a comparing unit 730 for comparing an output signal outputted from the latching unit 720 in accordance with a 1152 KHz clock signal CLK1152 from the first clock signal generating unit 500, a counting unit 740 for counting an output signal outputted from the comparing unit 730, a logic computation unit 750 for logically computing an output signal outputted from the reset signal generating unit 710 and output signal outputted from the counting unit 740, a frame offset signal generating unit 760 for receiving an output signal outputted from the latching unit 720 in accordance with a 1152 KHz clock signal CLK1152 from the first clock signal generating unit 500 and outputting a frame offset signal FO576, a timing signal generating unit 770 for receiving an output signal outputted from the latching unit 720 in accordance with a 1152 KHz clock signal outputted from the first clock signal generating unit 500 and outputting a timing signal MSB576, and a clock signal outputting unit 780 for receiving an output signal outputted from the latching unit 720 in accordance with a 1152 KHz clock signal CLK1152 from the first clock signal generating unit 500 and externally outputting a 576 KHz clock signal CLK576.

The second clock signal generating unit of FIG. 4 further includes an inverter 790 for inverting an output signal outputted from the logic computation unit 750.

The latching unit 720 includes a sixth D flip-flop 721 which receives an input logic signal INLG through an input terminal and receives a 1152 KHz clock signal CLK1152 from the first clock signal generating unit 500 through a clock signal terminal "clk". In the sixth D flip-flop 721, a set terminal "set" is connected with an output terminal of the reset signal generating unit 710, and a reset terminal "reset" is connected with an output terminal of the comparing unit 730, and an output terminal Q is connected with an input terminal of the frame offset signal generating unit 760. There is further provided a seventh D flip-flop 722 which receives an input logic signal INLG through an input terminal D and a 1152 KHz clock signal CLK1152 from the first clock signal generating unit 500 through a clock terminal. In the seventh D flip-flop 722, a set terminal "set" is connected with an output terminal of the logic computation unit 750, and a reset terminal "reset" is connected with an output terminal of the inverter 790, and an output terminal Q is connected with an input terminal of the timing signal generating unit 770. There is provided an eighth D flip-flop 723 having an input terminal D connected with an input terminal $Q_B$ and a clock signal terminal "clk" receiving a 1152 KHz clock signal CLK1152 from the first clock signal generating unit 500. In addition, in the eighth D flip-flop 723, a reset terminal "reset" is connected with an output terminal of the reset signal generating unit 710, and an output terminal Q is connected with an input terminal of the comparing unit 730.

The comparing unit 730 includes a fifth comparing unit 731 which receives a 1152 KHz clock signal CLK1152 from the first clock signal generating unit 500 and compares an output signal outputted from the sixth D flip-flop 721 inputted through an input terminal A and an output signal outputted from the eighth D flip-flop 723 inputted through another input terminal B and outputs a result value of the comparison to a reset terminal "reset" of the sixth D flip-flop 721 through an output terminal Z1 and outputs to the counting unit 740 through another output terminal Z1.

The counting unit 740 includes a third counting unit 741 having a reset terminal "reset" connected with an output terminal of the reset signal generating unit 710 for counting an output signal outputted from the fifth comparing unit 731 inputted through a clock terminal "clk" and outputting through output terminals $Q_0$, $Q_1$, $Q_2$.

The logic computation unit 750 includes an OR-gate 751 for ORing output signals outputted from the counting unit 740 and a fifth AND-gate 752 for ANDing an output signal outputted from the OR-gate 751 and output signal outputted from the reset signal generating unit 710.

The frame offset signal generating unit 760 includes an eighth D flip-flop 761 having a clock terminal "clk" receiving a 1152 KHz clock signal CLK1152 from the first clock generating unit 500, an input terminal D connected with an output terminal of the sixth D flip-flop 721 and an output terminal Q for outputting a frame offset signal FO576 therethrough.

The timing signal generating unit 770 includes a ninth D flip-flop 771 having a clock signal terminal "clk" receiving a 1152 KHz clock signal CLK1152 from the first clock signal generating unit 500, an input terminal D connected with an output terminal of the seventh D flip-flop 722 and an output terminal Q outputting a timing signal MSB576.

The clock signal output unit 781 includes a tenth D flip-flop 781 having a clock signal terminal "clk" receiving a 1152 KHz clock signal CLK1152 from the first clock signal generating unit 500, an input terminal D connected with an output terminal of the eighth D flip-flop 723 and an output terminal Q outputting a 576 KHz clock signal CLK576.

In addition, the third counting unit 741 is a 3-digit counting unit.

The operation of the second clock signal generating unit of FIG. 4 according to the present invention will be explained with reference to the accompanying drawings.

The reset signal generating unit 710 receives a 1152 KHz clock signal CLK1152 from the first clock signal generating unit 500 and a timing signal MSB1152 through an input terminal A and another input terminal B. When the clock signal CLK1152 is transited from a low level to a high level, the timing signal MSB1152 is judged to be a high level or a low level. If the signal is judged to be a high level, a low signal is outputted through an output terminal Z.

The sixth and seventh D flip-flops 721 and 722 output a high level output signal in accordance with a low level signal outputted from the reset signal generating unit 710. The eighth D flip-flop 723 outputs a low level signal in accordance with a low level signal outputted from the reset signal generating unit 710. In addition, the third counting unit 741 of the counting unit 740 outputs a low level output signal through the output terminals $Q_0$, $Q_1$, $Q_2$ in accordance with a low level signal outputted from the reset signal generating unit 710.

The eighth D flip-flop 723 feeds back an output signal outputted from the inverting output terminal $Q_B$ to the input terminal D and 2-divides a 1152 KHz clock signal CLK1152 and outputs a 576 KHz clock signal through the next output terminal Q.

The fifth comparing unit 731 receives an output signal outputted from the sixth D flip-flop 721 and an output signal outputted from the eighth D flip-flop through an input terminal A and another input terminal B, respectively, and compares the thusly received signals when a clock signal CLK1152 is transited from a low level to a high level. If an output signal outputted from the eighth D flip-flop 723 is a high level, a low level signal is outputted via an output terminal $Z_0$, and a high level signal is outputted through an output terminal $Z_1$.

In addition, the fifth D flip-flop 721 outputs a low level signal in accordance with a low level signal outputted through an output terminal $Z_0$ of the fifth comparing unit 731, and an output signal outputted from the third counting unit 741 is increased by 1 when an output signal outputted through an output terminal $Z_1$ of the fifth comparing unit 731 is transited from a low level to a high level.

When the third counting unit 741 outputs a low level signal through the output terminals $Q_0$, $Q_1$, $Q_2$, the OR-gate 751 outputs a low level signal, and the fifth AND-gate 752 receives a low level signal outputted from the OR-gate 751 and outputs a low level signal. The seventh D flip-flop 722 outputs a high level signal through an output terminal Q in accordance with a low level signal outputted from the fifth AND-gate 752.

The eighth D flip-flop 761 of the frame offset signal generating unit 760 performs a re-timing operation for an output signal outputted from the sixth D flip-flop 721 and outputs a frame offset signal FO576 which is transited to a high level by one frame, and the ninth D flip-flop 771 of the timing signal generating unit 770 performs a re-timing operation for an output signal outputted from the seventh D flip-flop 722 using a clock signal CLK1152 and outputs a timing signal MSB576 which is transited to a high level nine times by one frame, and the tenth D flip-flop 781 of the clock signal output unit 780 performs a re-timing operation for a signal outputted from the eighth D flip-flop 723 using a clock signal CLK1152 and outputs a clock signal CLK576.

Figure 8:
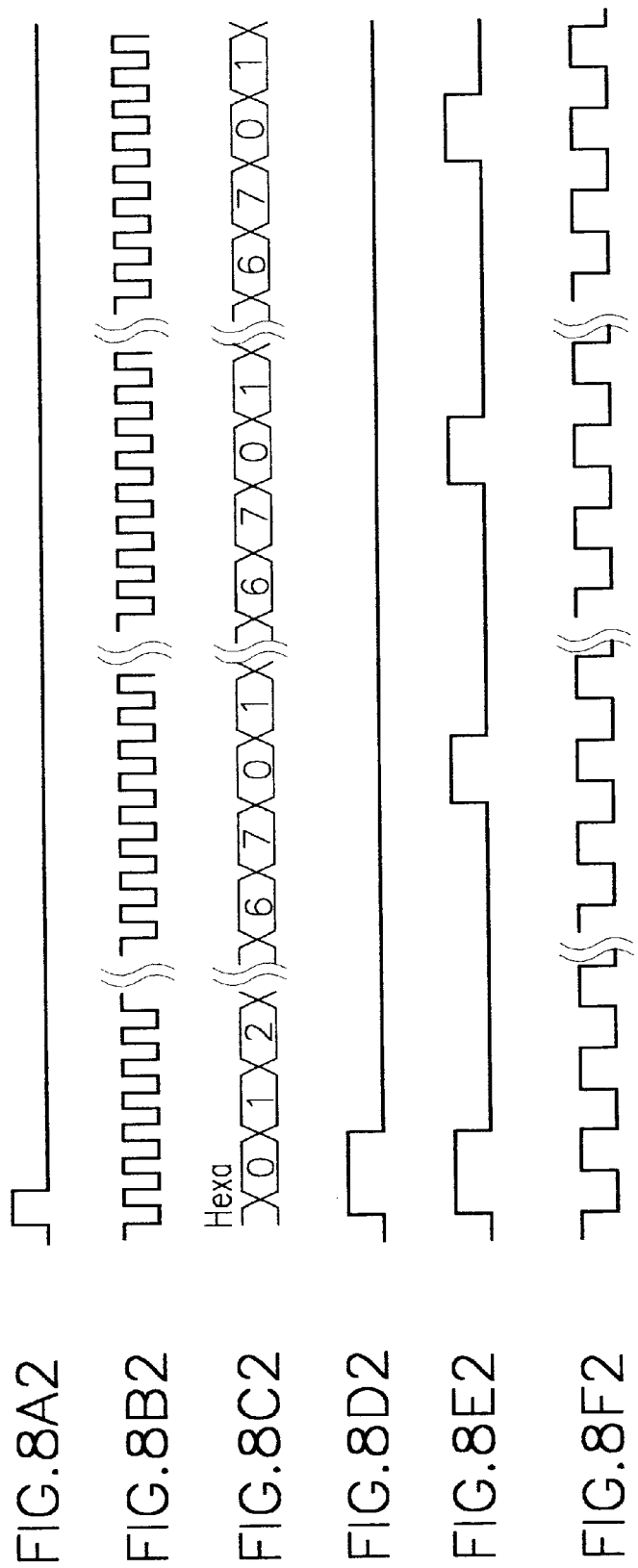

FIGS. 8A2 through F2 are wave form diagrams of timing of signals outputted from the second clock signal generating unit of FIG. 7 according to the present invention.

As shown therein, FIG. 8A2 illustrates an output timing of a timing signal MSB1152 outputted from the first clock signal generating unit 500, FIG. 8B2 illustrates an output timing of a clock signal outputted from the first clock signal generating unit 500, FIG. 8C2 illustrates an output timing of a signal outputted from the third counting unit 741, FIG. 8D2 illustrates an output timing of a frame offset signal FO576 outputted from the eighth D flip-flop 761, FIG. 8E2 illustrates an output timing of a timing signal MSB576 outputted from the ninth D flip-flop 771, and FIG. 8F2 illustrates an output timing of a clock signal CLK576 outputted from the tenth D flip-flop 781.

Figure 9:
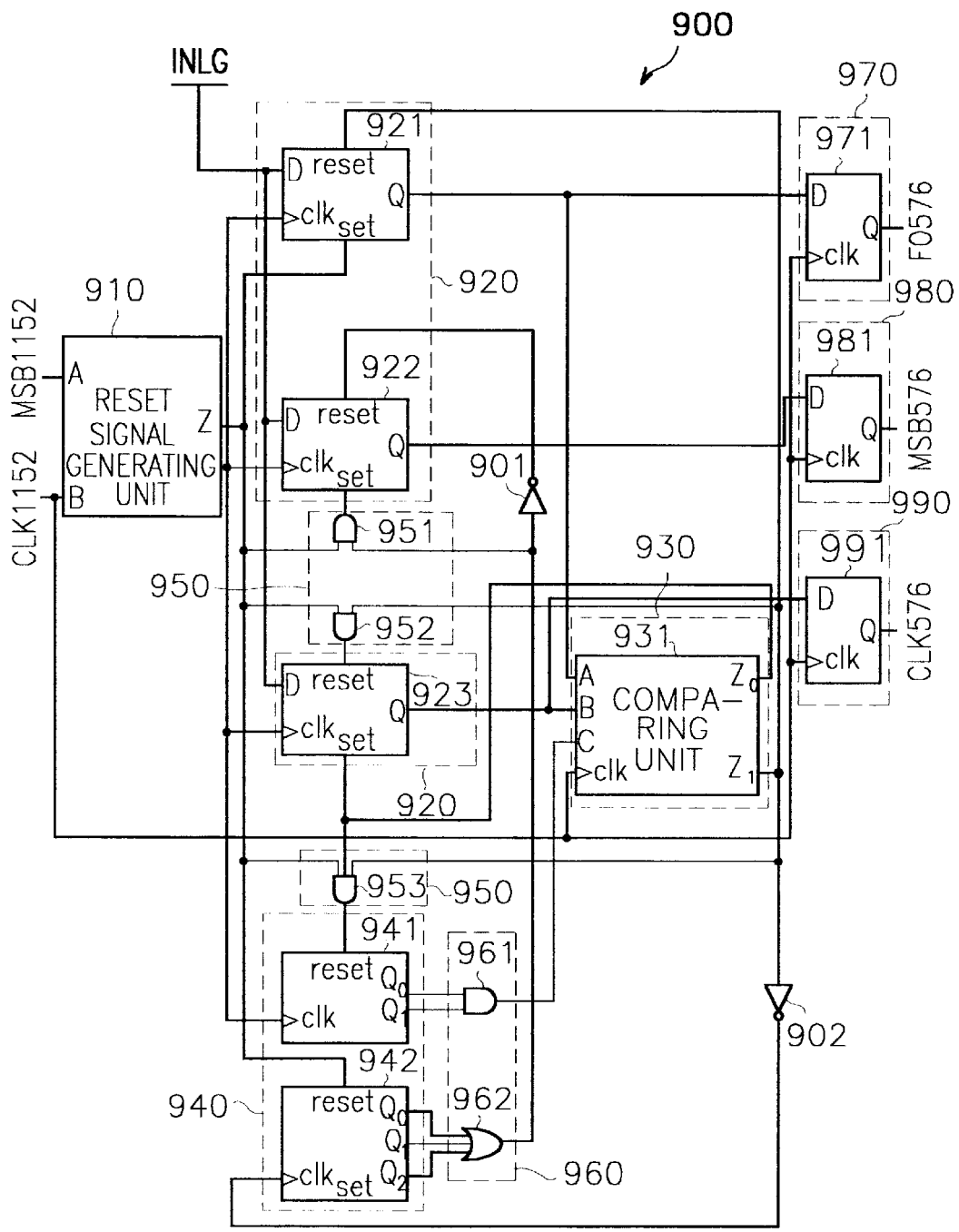
FIG. 9 is a block diagram illustrating a third clock signal generating unit of FIG. 4 according to the present invention.

FIG. 9 illustrates a third clock signal generating unit of FIG. 4 according to the present invention.

As shown therein, the third clock signal generating unit of FIG. 4 according to the present invention includes a reset signal generating unit 910 for receiving a timing signal MSB1152 outputted from the first clock signal generating unit 500 and a 1152 KHz clock signal CLK1152 and outputting a reset signal, a latching unit 920 for latching an externally inputted input logic signal INLG in accordance with a 1152 clock signal CLK1152 outputted from the first clock signal generating unit 500, a comparing unit 930 for comparing output signals outputted from the latching unit 920 in accordance with a 1152 KHz clock signal CLK1152 outputted from the first clock signal generating unit 500, a counting unit 940 for counting a 1152 KHz clock signal CLK1152 outputted from the first clock signal generating unit 500 and an output signal outputted from the comparing unit 730, a first logic computation unit 950 for logically computing an output signal outputted from the reset signal generating unit 910 and an output signal outputted from the counting unit 940, a second logic computation unit 960 for logically computing output signals outputted from the counting unit 940, a frame offset signal generating unit 970 for receiving an output signal outputted from the latching unit 920 in accordance with a 1152 KHz clock signal CLK1152 outputted from the first clock signal generating unit 500 and externally outputting a frame offset signal FO192, a timing signal generating unit 980 for receiving an output signal outputted from the latching unit 920 in accordance with a 1152 KHz clock signal CLK1152 outputted from the first clock signal generating unit 500 and outputting a timing signal MSB192, and a clock signal outputting unit 990 for receiving an output signal outputted from the latching unit 920 in accordance with a 1152 KHz clock signal CLK1152 outputted from the first clock signal generating unit 500 and externally outputting a 192 KHz clock signal CLK192.

In addition, the third clock signal generating unit includes a first inverter for inverting an output signal outputted from the second logic computation unit 960 and an second inverter 902 for inverting an output signal outputted from the comparing unit 930.

The latching unit 920 includes an eleventh D flip-flop 921 having an input terminal D receiving an input logic signal INLG and a clock terminal "clk" receiving a 1152 KHz clock signal CLK1152 outputted from the first clock signal generating unit 500. In addition, in the D flip-flop 921, a set terminal "set" is connected with an output terminal of the reset signal generating unit 910, a reset terminal "reset" is connected with an output terminal of the comparing unit 930, and an output terminal Q is connected with an input terminal of the frame offset signal generating unit 970. There is further provided a twelfth D flip-flop 922 includes an input terminal D receiving an input logic signal INLG and a clock signal terminal "clk" receiving a 1152 KHz clock signal CLK1152 outputted from the first clock signal generating unit 500. In the twelfth D flip-flop 922, a set terminal "set" is connected with an output terminal of the first logic computation unit 950, a reset terminal "reset" is connected with an output terminal of the first inverter 901, and an output terminal Q is connected with an input terminal of the timing signal generating unit 980. In addition, there is further provided a third D flip-flop 923 includes an input terminal D receiving an input logic signal INLG and a clock terminal "clk" receiving a 1152 KHz clock signal CLK1152 outputted from the first clock signal generating unit 500, a set terminal "set" is connected with an output terminal of the comparing unit 930, a reset terminal "reset" is connected with an output terminal of the reset signal generating unit 910, and an output terminal Q is connected with an input terminal of the comparing unit 930.

The comparing unit 930 includes a sixth comparing unit 931 which receives a 1152 KHz clock signal CLK1152 outputted from the first clock signal generating unit 500, compares an output signal outputted from the eleventh D flip-flop 921 through a first input terminal A, an output signal outputted from the thirteenth D flip-flop 923 through a second input terminal B, and an output signal outputted from the second logic computation unit 960, outputs a compared value to a set terminal "set" of the thirteenth D flip-flop 923 and the input terminal of the first logic computation unit 950 through an output terminal Z0, and outputs the compared value into an input terminal of the counting unit 940.

The counting unit 940 includes a fourth counting unit 941 having a reset terminal "reset" connected with an output terminal of the first logic computation unit 950 for counting an output signal outputted from the comparing unit 931 and inputted thereinto through the clock terminal "clk" and outputting to the output terminals $Q_0$ and $Q_0$, and a fifth counting unit 942 having a reset terminal "reset" connected with an output terminal of the reset signal generating unit 910 for counting an output signal outputted from the comparing unit 930 and inputted thereinto through the clock terminal "clk" 1 and outputting through the output terminals $Q_0$ $Q_1$ $Q_2$.

The first logic computation unit 950 includes a sixth AND-gate 951 ANDing an output signal outputted from the reset signal generating unit 910 and outputting to a set terminal "set" of the twelfth D flip-flop 922, a seventh AND-gate 952 for ANDing an output signal outputted from the reset signal generating unit 910 and an output signal outputted from the comparing unit 930 and outputting to a reset terminal "reset" of the thirteenth D flip-flop 922, and an eighth AND-gate 953 for ANDing an output signal outputted from the reset signal generating unit 910 and an output signal outputted from the comparing unit 930 and outputting to a reset terminal "reset" of the fourth counting unit 941.

The second logic computation unit 960 includes a ninth AND-gate 961 for ANDing output signals outputted through the output terminals $Q_0$ $Q_1$ of the fourth counting unit 941 and outputting to an input terminal C of the sixth comparing unit 931, and an OR-gate 962 for ORing output signals outputted through the output terminals $Q_0$, $Q_1$ and $Q_2$ of the fifth counting unit 942 and outputting to a reset terminal "reset" of the twelfth D flip-flop 922.

The frame offset signal generating unit 970 includes a fourteenth D flip-flop 971 having a clock terminal "clk" receiving a 1152 KHz clock signal CLK1152 outputted from the first clock signal generating unit 500 and an input terminal D connected with an output terminal Q of the eleventh D flip-flop 921 for outputting a frame offset signal F0192 through an output terminal Q.

The timing signal generating unit 980 includes a fifteenth D flip-flop 981 having a clock terminal "clk" receiving a 1152 KHz clock signal CLK1152 outputted from the first clock signal generating unit 500, an input terminal D connected with an output terminal Q of the twelfth D flip-flop 922 and an output terminal Q through which a timing signal MSB192 is outputted.

The clock signal output unit 990 includes a sixteenth D flip-flop 990 having a clock terminal "clk" receiving a 1152 KHz clock signal CLK1152 outputted from the first clock signal generating unit 500, an input terminal D connected with an output terminal Q of the thirteenth D flip-flop 923 and an output terminal Q through which a 192 KHz clock signal CLK192 is outputted.

In addition, the fourth counting unit 941 is a binary counting unit, and the fifth counting unit 942 is a 3-digit counting unit.

The operation of the third clock signal generating unit of FIG. 4 according to the present invention will be explained.

The reset signal generating unit 910 receives a 1152 KHz clock signal CLK1152 outputted from the first clock signal generating unit 500 and a timing signal MSB1152 through an input terminal A and another input terminal B, respectively, and the timing signal MSB1152 is judged to be a high level or a low level when the clock signal CLK1152 is transited from a low level to a high level. As a result of the judgement, if the signal is judged to be a high level, a low level reset signal is outputted through the output terminal Z.

The eleventh and twelfth D flip-flops 921 and 922 output a high level signal in accordance with a low level output signal outputted from the reset signal generation unit 910.

The thirteenth D flip-flop 923 outputs a low level signal through an output terminal Q in accordance with an low level output signal outputted from the reset signal generation unit 910, and the fourth counting unit 941 outputs a low level signal through the output terminals $Q_0$ and $Q_1$ in accordance with a low level output signal outputted from the reset signal generating unit 910, and the fifth counting unit outputs a low level signal through the output terminals $Q_0$ $Q_1$ and $Q_2$ in accordance with a low level output signal outputted from the reset signal generating unit 910. Here, an output signal outputted from the fourth counting unit 941 is increased by "1" when the clock signal CLK1152 is transited from a low level to a high level.

The sixth comparing unit 931 receives output signals outputted from the eleventh and thirteenth D flip-flops 921 and 923, respectively, and an output signal outputted from the ninth AND-gate 961 through the input terminals A, B and C and compares the thusly received signals when the clock signal CLK1152 is transited from a low level to a high level. The sixth comparing unit 931 outputs a low level signal through an output terminal Z0 only when a low level signal is inputted through the input terminal B and a high level signal is inputted through the input terminal C.

The thirteenth D flip-flop 923 outputs a high level signal through the output terminal Q in accordance with a low level signal outputted from the sixth comparing unit 931. The eighth AND-gate 953 ANDs low level signals outputted from the sixth comparing unit 931 and outputs a low level signal to the fourth counting unit 941, and the fourth counting unit 941 outputs a low level signal through the output terminals $Q_0$ and $Q_1$ in accordance with a low level signal outputted from the eighth AND-gate 953.

The sixth comparing unit 931 outputs a low level signal through the output terminal Z1 only when high signals are inputted through the input terminals A, B and C. The eleventh and thirteenth D flip-flops 921 and 923 output low level output signals in accordance with a low level signal outputted through an output terminal Z1 of the sixth comparing unit 931.

The eighth AND-gate 953 ANDs low level signals outputted through an output terminal Z1 of the sixth comparing unit 931 and outputs a low level signal to the fourth counting unit 941. The fourth counting unit 941 outputs a low level signal through the output terminals $Q_0$ and $Q_1$ in accordance with a low level signal outputted from the eighth AND-gate 953.

The signal outputted through an output terminal Z1 of the sixth comparing unit 931 is inverted by the inverter 902 and transferred to the fifth counting unit 940. The output signal outputted from the fifth counting unit 942 is increased by "1" when an output signal outputted from the inverter is transited from a low level to a high level.

Signals outputted through the output terminals $Q_0$, $Q_1$ and $Q_2$ of the fifth counting unit 942 are all low levels, the OR-gate 962 ORs output signals outputted from the fifth counting unit 942 and outputs a low level signal. The twelfth D flip-flop 922 outputs a high level signal in accordance with a low level signal outputted from the OR-gate 962.

The fourteenth D flip-flop 971 of the frame offset signal generating unit 970 performs a re-timing operation for a signal outputted from the eleventh D flip-flop 921 to a clock signal CLK1152 and outputs a frame offset signal F0192 which is once transited to a high level by one frame, and the fifteenth D flip-flop 981 of the timing signal generating unit 980 performs a re-timing operation for a signal outputted from the twelfth D flip-flop 922 to a clock signal CLK1152 and outputs a timing signal MSB192 which is transited to a high level three times by one frame, and the sixteenth D flip-flop 991 of the clock signal output unit 990 performs a re-timing operation for a signal outputted from the thirteenth D flip-flop 923 to a clock signal CLK1152 and outputs a clock signal CLK192.

FIGS. 10A3 through 10G3 are wave form diagrams of timing of signals outputted from the third clock signal generating unit of FIG. 9 according to the present invention.

As shown therein, FIG. 10A3 illustrates an output timing of a timing signal MSB1152 outputted from the first clock signal generating unit 500, FIG. 10B3 illustrates an output timing of a clock signal CLK1152 outputted from the first clock signal generating unit 500, FIG. 10C3 illustrates an output timing of a signal outputted from the fourth counting unit 941, FIG. 10D3 illustrates output timing of a signal outputted from the fifth counting unit 942, FIG. 10E3 illustrates an output timing of a frame offset signal F0192 outputted from the fourteenth D flip-flop 971, FIG. 10F3 illustrates an output timing of a timing signal MSB192 outputted from the fifteenth D flip-flop 981, and FIG. 10G3 illustrates an output timing of a clock signal CLK912 outputted from the eleventh D flip-flop 991.

As described above, in the clock signal generating apparatus for a data communication channel according to the present invention, it is possible to implement a reliable data insertion and extraction function and a serial/parallel data conversion function for a regenerator section data communication channel and a multiplex section data communication channel for a STM-N frame signal in a STM-N system, etc. for thereby achieving a reliable and stable operation of the system. In addition, when matching with an external apparatus for finally processing a data of a data communication channel, a clock signal is stable supplied, so that a reliable data communication is implemented for thereby enabling a high quality service for a data transfer apparatus. Furthermore, the present invention is basically directed to generating clock and timing signals used for extracting and inserting an overhead used for a regenerator section data communication channel and a multiplex section data communication channel in a section overhead formed in a STM-N frame structure for a STM-N system for thereby matching the thusly extracted and inserted overhead with an external apparatus.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A clock signal generating apparatus for a data communication channel, comprising:
   first clock signal generating means for receiving an external input clock signal and a frame position informing signal and outputting a first clock signal having a predetermined cycle signal and a first timing signal;
   second clock signal generating means for receiving the first clock signal and the first timing signal and externally outputting a first offset signal, a second timing signal, and a second clock signal having a predetermined cycle, respectively; and
   third clock signal generating means for receiving the first clock signal and the first timing signal and externally outputting a second offset signal, a third timing signal and a third clock signal having a predetermined cycle, respectively.

2. The apparatus of claim 1, wherein said first clock signal generating means includes:
   inverting means for inverting the frame position informing signal;
   selecting means for selectively outputting an output signal outputted from the inverting means and the frame position informing signal in accordance with an externally inputted selection signal;
   reset signal generating means for receiving the input clock signal and the output signal outputted from the selecting means and outputting a reset signal;
   latching means for latching an externally inputted input logic signal in accordance with the input clock signal and the reset signal outputted from the reset signal generating means;
   counting means for counting the input clock signal and outputting an output signal;
   comparing means for comparing an output signal outputted from the latching means and an output signal outputted from the counting means in accordance with the input clock signal;
   logic computation means for logically computing an output signal outputted from the comparing means and the reset signal outputted from the reset signal generating means and outputting signals to the latching means and the counting means, respectively;
   clock signal output means for receiving an output signal outputted from the latching means and an output signal outputted from the counting means in accordance with the input clock signal; and
   timing signal generating means for receiving an output signal outputted from the latching means in accordance with the input clock signal and outputting a first timing signal.

3. The apparatus of claim 2, wherein said latching means includes:
   a first D flip-flop having an input terminal for receiving an input logic signal, a clock terminal for receiving the input clock signal, a set terminal connected with an output terminal of the reset signal generating means, a reset terminal connected with an output terminal of the comparing means and an output terminal connected with an input terminal of the timing signal generating means;
   a second D flip-flop having an input terminal for receiving the input logic signal, a clock terminal for receiving input clock signal, a set terminal connected with an output terminal of the comparing means, a reset terminal connected with an output terminal of the logic computation means, and an output terminal connected with the input terminals of the comparing means and the clock signal output means, respectively; and
   a third D flip-flop having an input terminal receiving the input logic signal, a clock terminal receiving the input clock signal, a set terminal connected with an output terminal of the comparing means, a reset terminal connected with an output terminal of the logic computation means and an output terminal connected with the input terminals of the comparing means and the clock signal output means.

4. The apparatus of claim 3, wherein said counting means includes:

a first counting unit having a clock terminal receiving the input clock signal, a reset terminal connected with an output terminal of the logic computation means and an output terminal connected with an input terminal of the comparing means; and a second counting unit having a clock terminal receiving the input clock signal, a set terminal connected with an output terminal of the reset signal generating unit, a reset terminal connected with an output terminal of the logic computation means and an output terminal connected with an input terminal of the comparing means.

5. The apparatus of claim 4, wherein said comparing means includes:

a first comparing unit having a clock terminal receiving the input clock signal, an input terminal connected with an output terminal of the second D flip-flop, another input terminal connected with an output terminal of the first counting unit and an output terminal connected with an input terminal of the logic computation means;

a second comparing unit having a clock signal terminal receiving the input clock signal, an input terminal connected with an output terminal of the second D flip-flop, another input terminal connected with an output terminal of the first counting unit and an output terminal connected with a reset terminal of the first D flip-flop and an input terminal of the logic computation means, respectively; and a third and a fourth comparing unit, each having a clock terminal receiving the input clock signal, an input terminal for connected with an output terminal of the third D flip-flop, another input terminal connected with an output terminal of the second counting unit, and an output terminal connected with an input terminal of the logic computation means.

6. The apparatus of claim 5, wherein said logic computation means includes:

a first logic computation unit for logically ANDing an output signal outputted from the reset signal generating means and an output signal outputted from the first comparing unit and outputting a resultant value to a reset terminal of the second D flip-flop;

a second logic computation unit for logically ANDing an output signal outputted from the reset signal generating means, an output signal outputted from the first comparing unit, and an output signal outputted from the second comparing unit, and outputting a resultant value to a reset terminal of the first counting unit;

a third logic computation unit for logically ANDing an output signal outputted from the reset signal generating means and an output signal outputted from the third comparing unit and outputting a resultant value to a reset terminal of the third D flip-flop; and a fourth logic computation unit for logically ANDing output signals outputted from the third and fourth comparing units which signals are inputted thereinto through the input terminals and outputting a resultant value to a reset terminal of the second counting unit.

7. The apparatus of claim 6, wherein said clock signal output means includes:

a fifth logic computation unit for logically ORing output signals outputted from the second and third D flip-flops; and a fourth D flip-flop having a clock terminal receiving the input clock signal, an input terminal connected with an output terminal of the fifth logic computation unit and an output terminal outputting a first clock signal.

8. The apparatus of claim 7, wherein said timing signal generating means includes:

a fifth D flip-flop having a clock terminal for receiving an input clock signal, an input terminal connected with an output terminal of the first D flip-flop, and an output terminal for outputting a first timing signal.

9. The apparatus of claim 1, wherein said second clock signal generating means includes:

reset signal generating means for receiving the first timing signal and a first clock signal and for outputting a reset signal;

latching means for performing a flip-flop operation using an externally inputted input logic signal in accordance with the first clock signal;

comparing means for comparing output signals outputted from the latching means in accordance with the first clock signal;

counting means for counting an output signal outputted from the comparing means;

logic computation means for logically computing the reset signal and an output signal outputted from the counting means;

frame offset signal generating means for receiving an output signal outputted from the latching means in accordance with the first clock signal and externally outputting a first frame offset signal;

timing signal generating means for receiving an output signal outputted from the latching means in accordance with the first clock signal and outputting a second timing signal; and clock signal generating means for receiving an output signal outputted from the latching means in accordance with the first clock signal and externally outputting the second clock signal.

10. The apparatus of claim 9, wherein said latching means includes:

a first D flip-flop having an input terminal receiving an input logic signal, a clock signal terminal receiving the first clock signal, a set terminal connected with an output terminal of the reset signal generating means, a reset terminal connected with an output terminal of the comparing means and an output terminal connected with an input terminal of the frame offset signal generating means;

a second D flip-flop having an input terminal receiving the input logic signal, a clock terminal receiving the first clock signal, a set terminal connected with an output terminal of the logic computation means, a reset terminal connected with an output terminal of the logic computation means and an output terminal connected with an input terminal of the timing signal generating means; and a third D flip-flop having an input terminal connected with an output terminal, a clock terminal receiving the first clock signal, a reset signal connected with an output terminal of the reset signal generating means, and another output terminal connected with an input terminal of the comparing means.

11. The apparatus of claim 10, wherein said comparing means receives the clock signal through a clock terminal and compares an output signal outputted from the first D flip-flop and an output signal outputted from the second D flip-flop and outputs a resultant compared value to a reset terminal of the first D flip-flop through an output terminal and outputs to the counting means through another output terminal.

12. The apparatus of claim 11, wherein said counting means includes a counting unit having a reset terminal connected with an output terminal of the reset signal generating means and counts an output signal inputted from the comparing means through a clock terminal and outputs through an output terminal.

13. The apparatus of claim 12, wherein said logic computation means includes:
a first logic computation unit for logically ORing output signals outputted from the counting means; and
a second logic computation unit for logically ANDing an output signal outputted from the first logic computation unit and an output signal outputted from the reset signal generating means.

14. The apparatus of claim 13, wherein said frame offset signal generating means includes a third D flip-flop having a clock terminal receiving the first clock signal, an input terminal connected with an output terminal of the first D flip-flop and an output terminal through which a second frame offset signal is outputted.

15. The apparatus of claim 14, wherein said timing signal generating means includes a fourth D flip-flop having a clock terminal receiving the first clock signal, an input terminal connected with an output terminal of the second D flip-flop and an output terminal through which a second timing signal is outputted.

16. The apparatus of claim 15, wherein said clock signal output means includes a fifth D flip-flop having a clock terminal receiving the first clock signal, an input terminal connected with an output terminal of the third D flip-flop and an output terminal through which a second clock signal is outputted.

17. The apparatus of claim 13, further comprising inverting means for inverting an output signal outputted from the first logic computation unit.

18. The apparatus of claim 1, wherein said third clock signal generating means includes:
reset signal generating means for receiving a first timing signal and a first clock signal and outputting a reset signal;
latching means for latching an externally inputted input logic signal in accordance with the first clock signal;
comparing means for comparing output signals outputted from the latching means in accordance with the first clock signal;
counting means for counting output signals outputted from the first clock signal and comparing means;
first logic computation means for logically computing the reset signal and an output signal outputted from the counting means;
second logic computation means for logically computing an output signal outputted from the counting means;
frame offset signal generating means for receiving an output signal outputted from the latching means in accordance with the first clock signal and externally outputting a second frame offset signal;
timing signal generating means for receiving an output signal outputted from the latching means in accordance with the first clock signal and outputting a third timing signal; and
clock signal output means for receiving an output signal outputted from the latching means in accordance with the first clock signal and externally outputting the third clock signal.

19. The apparatus of claim 18, wherein said latching means includes:

a first D flip-flop having an input terminal receiving the input logic signal, a clock terminal receiving the first clock signal, a set terminal connected with an output terminal of the reset signal generating means, a reset terminal connected with an output terminal of the comparing means and an output terminal connected with an input terminal of the frame offset signal generating means;
a second D flip-flop having an input terminal receiving the input logic signal, a clock terminal receiving the first clock signal, a set terminal connected with an output terminal of the first logic computation means, a reset terminal receiving an output signal outputted from the second logic means, and an output terminal connected with an input terminal of the timing signal generating means; and
a third D flip-flop having an input terminal receiving the input logic signal, a clock signal receiving the first clock signal, a set terminal connected with an output terminal of the comparing means, a reset terminal connected with an output terminal of the reset signal generating means and an output terminal connected with an input terminal of the comparing means.

20. The apparatus of claim 18, wherein said comparing means receives the first clock signal through a clock terminal and compares an output signal outputted from the first D flip-flop which signal is inputted thereinto through the first input terminal, an output signal outputted from the third D flip-flop which signal is inputted thereinto through the second input terminal, and an output signal outputted from the second logic computation means and outputs a resultant compared value to the set terminal of the third D flip-flop and the input terminal of the first logic computation means, respectively, through an output terminal and outputs the resultant compared value to an input terminal of the counting means through another output terminal.

21. The apparatus of claim 19, wherein said counting means includes:
a first counting unit having a reset terminal connected with an output terminal of the first logic computation means and counting an output signal outputted from the comparing means which signal is inputted thereinto through a clock terminal and outputting through an output terminal; and
a second counting means having a reset terminal connected with an output terminal of the reset signal generating means and counting an output signal outputted from the comparing means which signal is inputted thereinto through a clock terminal and outputting through an output terminal.

22. The apparatus of claim 20, wherein said first logic computation means includes:
a first logic computation unit for logically ANDing an output signal outputted from the reset signal generating means and an output signal outputted from the second logic computation means and outputting to a set terminal of the second D flip-flop;
a second logic computation unit for logically ANDing an output signal outputted from the reset signal generating means an output signal outputted from the comparing means and outputting to a reset terminal of the third D flip-flop; and
a third logic computation unit for logically ANDing an output signal outputted from the reset signal generating means and an output signal outputted from the comparing means and outputting to a reset terminal of the first counting unit.

23. The apparatus of claim 21, wherein said second logic computation means includes:
- a fourth logic computation unit for logically ANDing output signals outputted from an output terminal of the first counting unit and outputting to an input terminal of the comparing means; and
- a fifth logic computation unit for logically ORing output signals outputted from an output terminal of the second counting unit and outputting to a reset terminal of the second D flip-flop.

24. The apparatus of claim 22, wherein said frame offset signal generating means includes:
- a fourth D flip-flop having a clock terminal for receiving a first clock signal, an input terminal connected with an output terminal of the first D flip-flop and an output terminal through which a second frame offset signal is outputted.

25. The apparatus of claim 23, wherein said timing signal generating means includes:
- a fifth D flip-flop having a clock terminal for receiving the first clock signal, an input terminal connected with an output terminal of the second D flip-flop and an output terminal through which a third timing signal is outputted.

26. The apparatus of claim 24, wherein said clock signal outputting means includes:
- a sixth D flip-flop having a clock terminal receiving the first clock signal, an input terminal connected with an output terminal of the third D flip-flop and an output terminal through which a third clock signal is outputted.

27. The apparatus of claim 18, further comprising:
- first inverting means for inverting an output signal outputted from the fifth logic computation unit; and
- second inverting means for inverting an output signal outputted from the comparing means.

* * * * *